United States Patent
Ober et al.

(10) Patent No.: US 7,774,585 B2
(45) Date of Patent: Aug. 10, 2010

(54) INTERRUPT AND TRAP HANDLING IN AN EMBEDDED MULTI-THREAD PROCESSOR TO AVOID PRIORITY INVERSION AND MAINTAIN REAL-TIME OPERATION

(75) Inventors: Robert E. Ober, San Jose, CA (US); Roger D. Arnold, Sunnyvale, CA (US); Daniel F. Martin, Mountain View, CA (US); Erik K. Norden, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 189 days.

(21) Appl. No.: 10/712,473

(22) Filed: Nov. 12, 2003

(65) Prior Publication Data

US 2005/0102458 A1    May 12, 2005

(51) Int. Cl.
    *G06F 9/00* (2006.01)
(52) U.S. Cl. .................................... 712/244
(58) Field of Classification Search ............ 712/244
    See application file for complete search history.

(56) References Cited

U.S. PATENT DOCUMENTS

| | | | | |
|---|---|---|---|---|
| 5,197,138 A | * | 3/1993 | Hobbs et al. ............. | 712/222 |
| 6,823,414 B2 | * | 11/2004 | Radhakrishna .......... | 710/262 |
| 6,944,736 B2 | * | 9/2005 | Wilson et al. ........... | 711/167 |
| 2003/0005251 A1 | * | 1/2003 | Wilson et al. ........... | 711/167 |
| 2003/0005252 A1 | * | 1/2003 | Wilson et al. ........... | 711/167 |

* cited by examiner

*Primary Examiner*—Aimee J Li
(74) *Attorney, Agent, or Firm*—Dickstein, Shapiro, LLP.

(57) ABSTRACT

A real-time, multi-threaded embedded system includes rules for handling traps and interrupts to avoid problems such as priority inversion and re-entrancy. By defining a global interrupt priority value for all active threads and only accepting interrupts having a priority higher than the interrupt priority value, priority inversion can be avoided. Switching to the same thread before any interrupt servicing, and disabling interrupts and thread switching during interrupt servicing can simplify the interrupt handling logic. By storing trap background data for traps and servicing traps only in their originating threads, trap traceability can be preserved. By disabling interrupts and thread switching during trap servicing, unintended trap re-entrancy and servicing disruption can be prevented.

40 Claims, 9 Drawing Sheets

INTERRUPT AND TRAP HANDLING IN AN EMBEDDED MULTI-THREAD PROCESSOR TO AVOID PRIORITY INVERSION AND MAINTAIN REAL-TIME OPERATION

BACKGROUND OF THE INVENTION

1. Field of the Invention

The invention relates to real-time embedded processors, and in particular, to a method and system for handling interrupts and traps in a multi-threaded processor without introducing priority inversion and unwanted re-entrancy.

2. Discussion of Related Art

An embedded system is a system that includes an embedded processor for controlling the behavior of that system. For example, modern automobiles, home appliances, personal electronics, and entertainment systems all typically include at least one embedded processor. These embedded systems are increasingly being required to provide "real-time" operation—i.e., the system must provide accurate and timely responses to external events. One of the keys to real-time performance is that a system respond to interrupt requests within a very short time period (e.g., tens of clock cycles). Therefore, real-time embedded processors typically should not queue interrupt requests and then service them on a scheduled basis.

As real-time embedded systems become ever more complex, the use of multithreaded code in such systems becomes increasingly appealing. Multithreaded code allows a processor to hold the state of several active threads. Each of the active threads can be executed independently, so that when one of the threads becomes blocked (e.g., due to a cache miss) another thread can be executed so that processor cycles are not wasted. This thread switching capability can significantly enhance system responsiveness by making more efficient use of processor capacity. In addition, multithreading allows state information to be efficiently shared among the active threads, and can therefore reduce the size and cost of the resources required for a given system.

Unfortunately, the conventions of real-time embedded systems can conflict with the desired operating characteristics of multithreaded code. For example, as noted above, real-time systems respond to all interrupt requests almost immediately. However, in a multi-threaded system (i.e., a system running multi-threaded code), accepting interrupt requests as soon as such requests are made can result in "priority inversion." In a multi-threaded system, the active threads are assigned thread priority values that determine which active thread is actually executed at a particular point in time. Priority inversion occurs when a lower-priority thread prevents a higher-priority thread from executing, which can result in a critical deadline being missed, which in turn can lead to system failure.

FIG. 1 shows an operational diagram for a multi-threaded system that includes two active threads T0 and T1. As indicated by the "THREAD PRIORITY" axis, thread T0 is assigned a higher priority than thread T1. At a time t0, thread T0 is executing (indicated by the diagonal hatching), while thread T1 is held pending (indicated by the solid white fill). At a time t1, a blocking event (such as a cache miss) occurs, and the execution of thread T0 is halted (indicated by the cross-hatching). Because thread T0 is blocked, lower-priority thread T1 then begins executing at time t1.

At a time t2, an interrupt request is generated, at which point an interrupt handler IH1 associated with thread T1 begins servicing the requested (low-priority) interrupt INT1. Because interrupt handler IH1 is still servicing interrupt INT1 when thread T0 becomes unblocked at a time t3, thread T0 cannot resume execution until the interrupt handler is finished with interrupt INT1 at a time t4. Thus, for the period from time t3 to time t4, threads T0 and T1 are in priority inversion, with the execution of high-priority thread T0 being pre-empted by the low-priority interrupt INT1, and therefore low-priority thread T1.

Traps (i.e., internally generated responses to internal conditions, such as error conditions) pose a similar problem for multi-threaded systems. Trap routines rely on the traceable nature of a trap to resolve and rectify a problem, and then restart the task that caused the trap. However, multi-threaded systems can encounter difficulties with trap handling due to the fact that traps can be either synchronous or asynchronous. A synchronous trap occurs during or immediately after the instruction that led to the trap condition, whereas an asynchronous trap can occur some time after the causal instruction. Therefore, in a multi-threaded system, by the time an asynchronous trap is generated, a thread switch or multiple thread switches may have already occurred. This can make the thread that originated the trap difficult to identify, which in turn can lead to problems servicing the trap.

Furthermore, because the multiple active threads of a multi-threaded system can all generate trap conditions, a trap condition from one thread can be generated while a trap from another thread is being serviced. For example, FIG. 2 shows an operational diagram for a multi-threaded system that includes two active threads T0 and T1. As in FIG. 1, thread T0 is assigned a higher priority than thread T1, as indicated by the "THREAD PRIORITY" axis. At a time t0, thread T0 is executing (indicated by the diagonal hatching), while thread T1 is held pending (indicated by the solid white fill). At a time t1, a blocking event for thread T0 occurs, and the execution of thread T0 is disabled (indicated by the cross-hatching). Because thread T0 is blocked, lower-priority thread T1 begins executing at time t1.

At a time t2, thread T1 generates a low priority trap TR1. Because thread T1 is executing at the time trap TR1 is generated, trap TR1 is a synchronous trap. Thread T1 branches to a trap handler TH1 and begins servicing trap TR1 at time t2. However, before this servicing of trap TR1 is completed, thread T0 generates a higher-priority asynchronous trap TR0 at time t3. Because trap TR0 has a higher priority than trap TR1, thread T0 branches to a trap handler TH0 and immediately begins servicing trap TR0 even though trap TR1 has not been fully serviced. Because both trap handlers TH0 and TH1 may use the same shared resources, trap TR0 is unintentionally re-entrant (indicated by the solid black fill). Therefore, trap TR0 may be serviced incorrectly due to ill-defined information states resulting from the incomplete operation of trap handler TH1. Interrupted trap handler TH1 may also fail to execute properly due to this unexpected re-entrancy.

Thus, it is desirable to provide a method and system for allowing a real-time embedded system to run multi-threaded code that properly handles interrupts without generating priority inversion conditions, and properly handles traps without causing unintended trap re-entrancy.

SUMMARY OF THE INVENTION

Accordingly, a real-time embedded system in accordance with the invention includes threshold interrupt logic and/or trap-tagging logic for preventing priority inversion, ensuring proper servicing of traps, and preventing unintended trap re-entrancy during multi-threaded operation. Interrupt handling logic in accordance with an embodiment of the invention assigns interrupts individual interrupt priority values, while associating a single interrupt threshold value with all active threads. An interrupt must have an interrupt priority value higher than the current interrupt threshold value to be serviced. Therefore, the conditions for priority inversion are eliminated, as any interrupt being serviced will have a higher priority than any pending thread. By adjusting the interrupt threshold value, the system can increase or decrease the number of interrupts that can be accepted by the system.

According to another embodiment of the invention, an "interrupt thread" can be designated by the system, and execution would be switched to the interrupt thread prior to servicing any interrupt. By always using the same thread for interrupt handling, the logic for saving and restoring the thread context during interrupt handling can be significantly simplified. According to another embodiment of the invention, interrupts and thread switching can be disabled once an interrupt is accepted to further reduce interrupt handling complexity.

According to another embodiment of the invention, a trap can be handled only in the thread originating the trap. Trap handling logic in accordance with an embodiment of the invention can record trap background data and generate a "trap pending" indicator in response to an asynchronous trap. Then when the originating thread begins executing, the trap pending indicator instructs the thread to service the trap using the stored trap background data to ensure correct trap handling. According to an embodiment of the invention, each thread can include dedicated "trap registers" for storing trap background data. According to another embodiment of the invention, the trap handling logic stores trap background data for all detected traps. According to another embodiment of the invention, interrupts and thread switching can be disabled once a trap is taken to prevent problems such as unintended trap re-entrancy. According to another embodiment of the invention, both the interrupt and trap handling logic can use the same disabling logic for disabling interrupts and thread switching during interrupt and trap handling. According to another embodiment of the invention, a multithreaded system including interrupt and trap handling logic can include lookahead logic to ensure thread execution immediately upon completion of interrupt or thread handling routines.

The present invention will be more fully understood in view of the following description and drawings.

DETAILED DESCRIPTION

Figure 1:
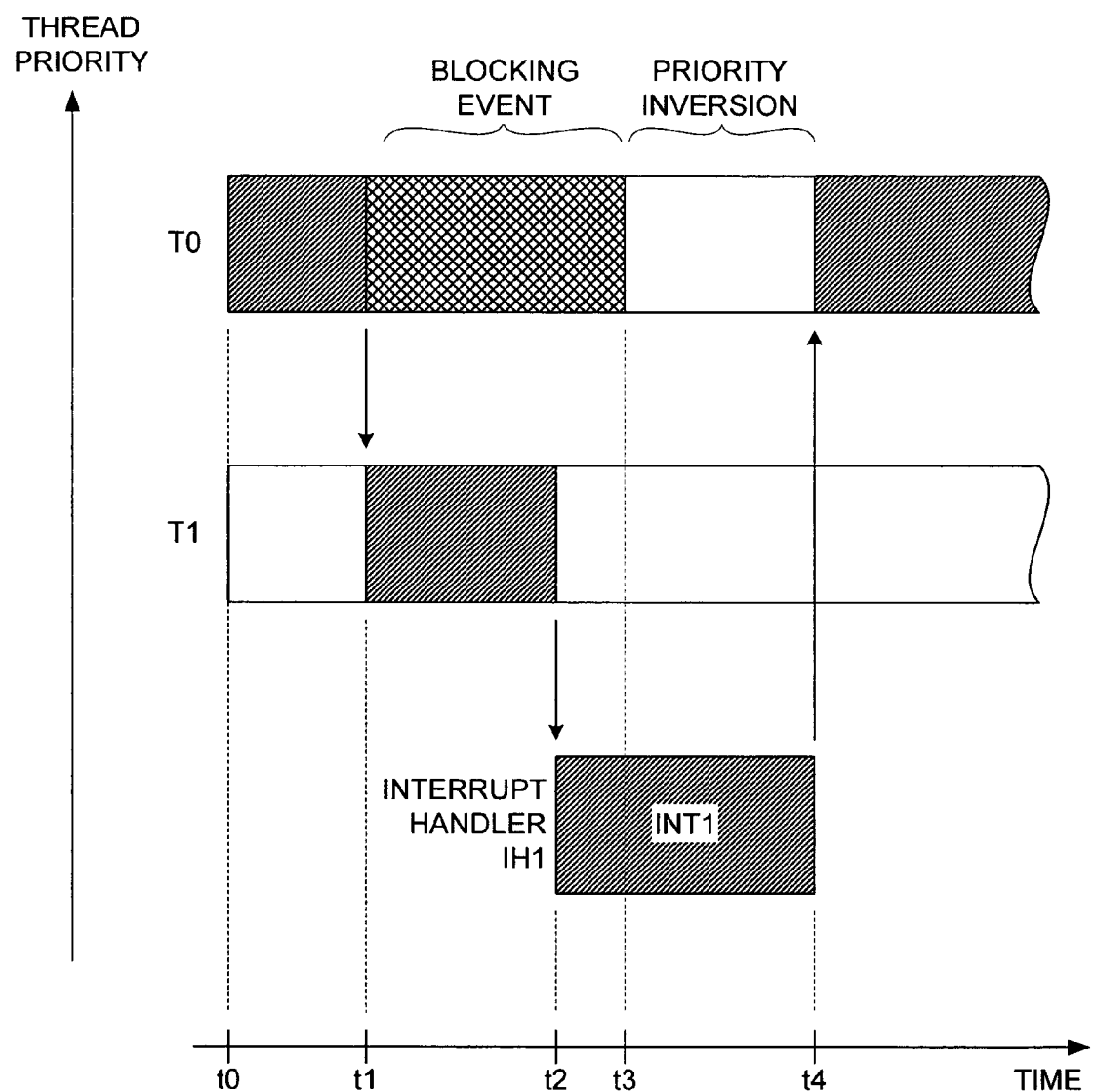
FIG. 1 is an operational diagram for a multi-threaded system demonstrating priority inversion.
Figure 2:
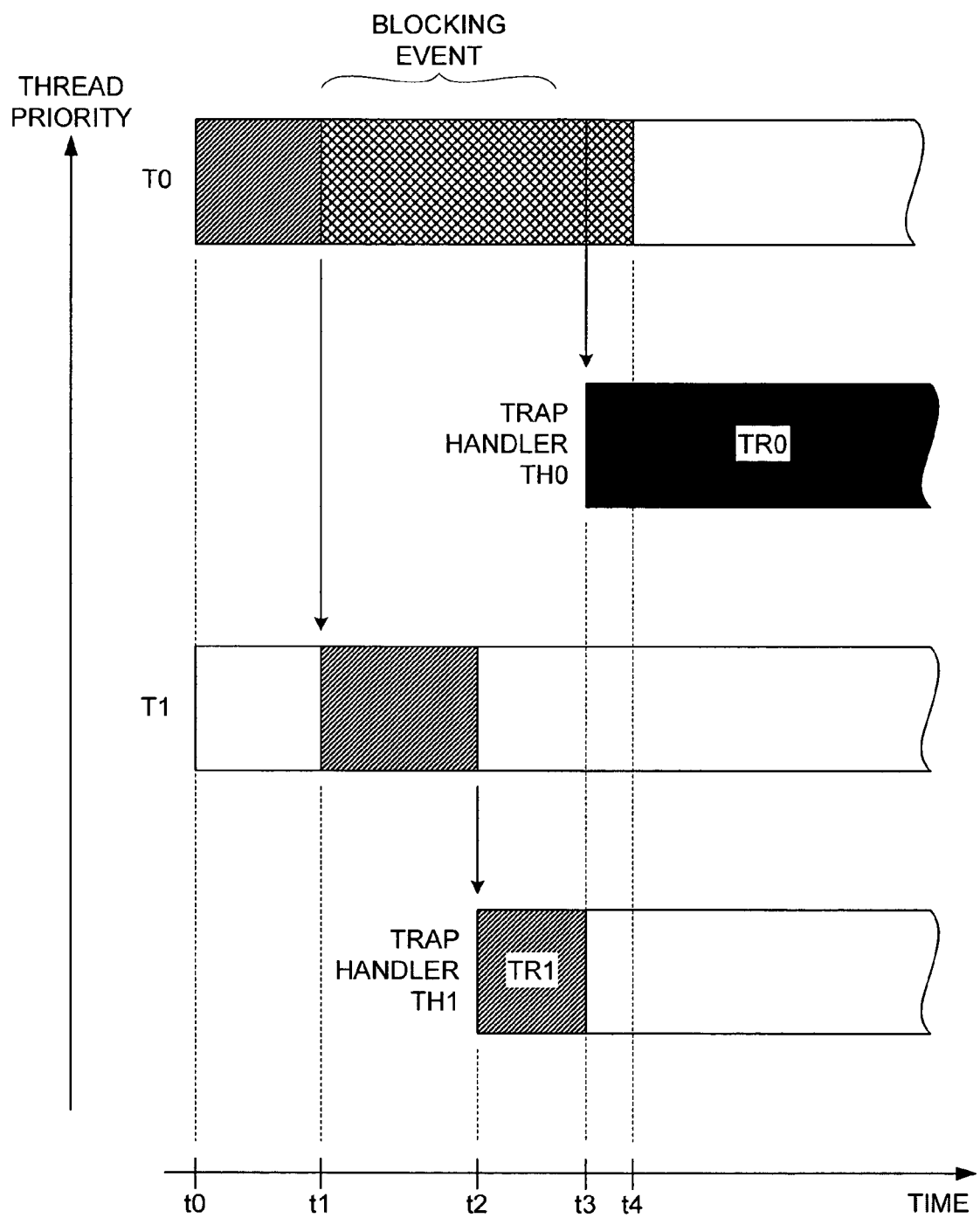
FIG. 2 is an operational diagram for a multi-threaded system demonstrating re-entrant trap handling.
Figure 3:
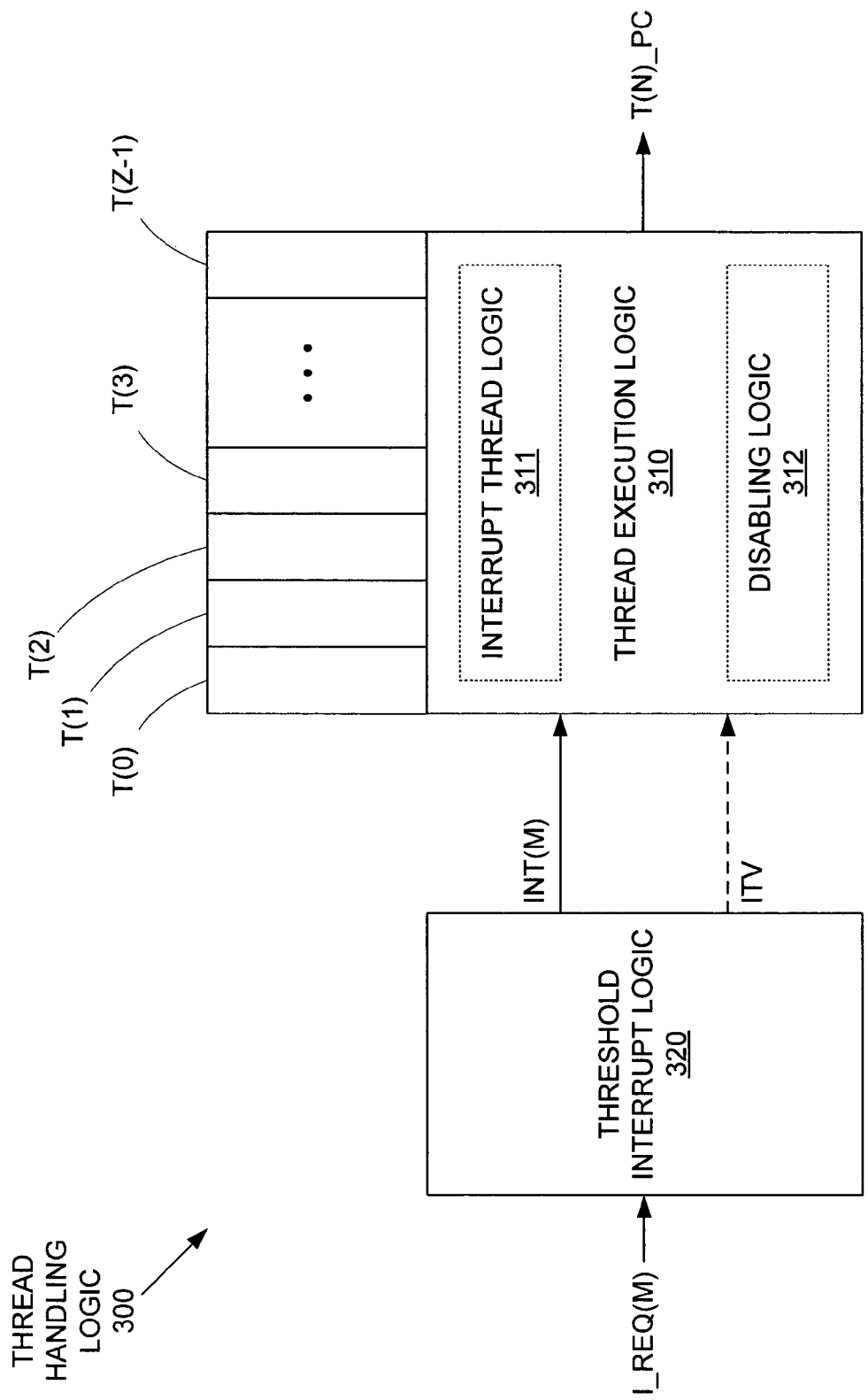
FIG. 3 is a simplified block diagram of a thread handling logic unit including threshold interrupt logic in accordance with an embodiment of the invention.

FIG. 3 shows a simplified block diagram of thread handling logic 300 for a multi-threaded real-time embedded system (not shown), according to an embodiment of the invention. Thread handling logic 300 is based on multi-threaded code and includes thread execution logic 310 for managing the execution of a quantity Z of active threads (T(0) through T(Z−1)) and threshold interrupt logic 320 for directing the processing of interrupts. Thread execution logic 310 assigns each active thread an execution priority value (similar to the thread priority values described with respect to FIGS. 1 and 2). During normal operation (i.e., non-interrupt/trap operation) of thread handling logic 300, thread execution logic 310 executes the highest priority unblocked active thread (thread T(N) for discussion purposes) by providing its thread program counter T(N)_PC to an instruction fetch unit (not shown). After each instruction fetch, thread execution logic 310 increments thread program counter T(N)_PC to select the next instruction in the executing thread. When a blocking event occurs (such as a cache miss or a thread timeout, as described in co-owned, co-pending U.S. Patent Application [INF-021]), thread execution logic 310 switches to the next highest priority unblocked thread so that processor cycles are not wasted.

To avoid priority inversion, thread handling logic 300 processes interrupts using a global interrupt handling methodology in which threshold interrupt logic 320 specifies an interrupt threshold value ITV that controls interrupt handling across all active threads. More specifically, an interrupt is only accepted by thread execution logic 310 if a unique interrupt priority value (IPV) assigned to that interrupt is higher than interrupt threshold value ITV. In this manner, interrupt threshold value ITV effectively represents a global interrupt priority value for all active threads T(0)-T(Z−1). Therefore, since any interrupt accepted by thread execution logic 310 must have a higher interrupt priority value than this global interrupt priority value, any interrupt being serviced will always have a higher interrupt priority than any of the active threads, thereby preventing priority inversion.

According to an embodiment of the invention, an interrupt request I_REQ(M) is received by threshold interrupt logic 320, which compares the interrupt priority of the requested interrupt (an interrupt INT(M)) to interrupt threshold value ITV. If the interrupt priority is higher than interrupt threshold value ITV, threshold interrupt logic 320 passes interrupt INT(M) to thread execution logic 310 for servicing (i.e., thread program counter T(N)_PC replaced with the address of an interrupt handler (interrupt service routine, or ISR) for interrupt INT(M)). Otherwise, interrupt request I_REQ(M) is ignored. According to another embodiment of the invention, interrupt threshold value ITV is passed from threshold interrupt logic 320 to thread execution logic 310 (as indicated by the dashed arrow) and is assigned to each of the active threads. Then, all interrupts are passed to thread execution logic 310, which only accepts those interrupts having an interrupt priority value higher than interrupt threshold value ITV.

In any case, when an interrupt is accepted by thread execution logic 310, the context of the executing thread is saved to memory and execution branches to the ISR. To simplify context management and the underlying multi-threaded code, according to another embodiment of the invention thread execution logic 310 includes interrupt thread logic 311. Interrupt thread logic 311 forces execution to switch to a predetermined "interrupt thread" before taking the interrupt (if the interrupt thread is not already executing). Any of active threads T(0)-T(Z−1) can be designated the interrupt thread by thread execution logic 310. By always taking interrupts in the same interrupt thread, the multi-threaded code implicitly knows which thread context is saved when an interrupt is taken, thereby simplifying the logic required to keep track of the branch and return routines for processing an interrupt.

According to another embodiment of the invention, thread execution logic 310 includes disabling logic 312 for disabling interrupts and thread switching once an interrupt has been accepted, and re-enabling interrupts and thread switching after a predetermined interval. The predetermined interval can be specified by thread execution logic 310 to be any interval that is long enough to allow usage of any shared resources by the ISR to be completed. In this manner, lower priority threads can be prevented from claiming shared resources that the (higher priority) ISR may subsequently need to access.

Figure 4A:
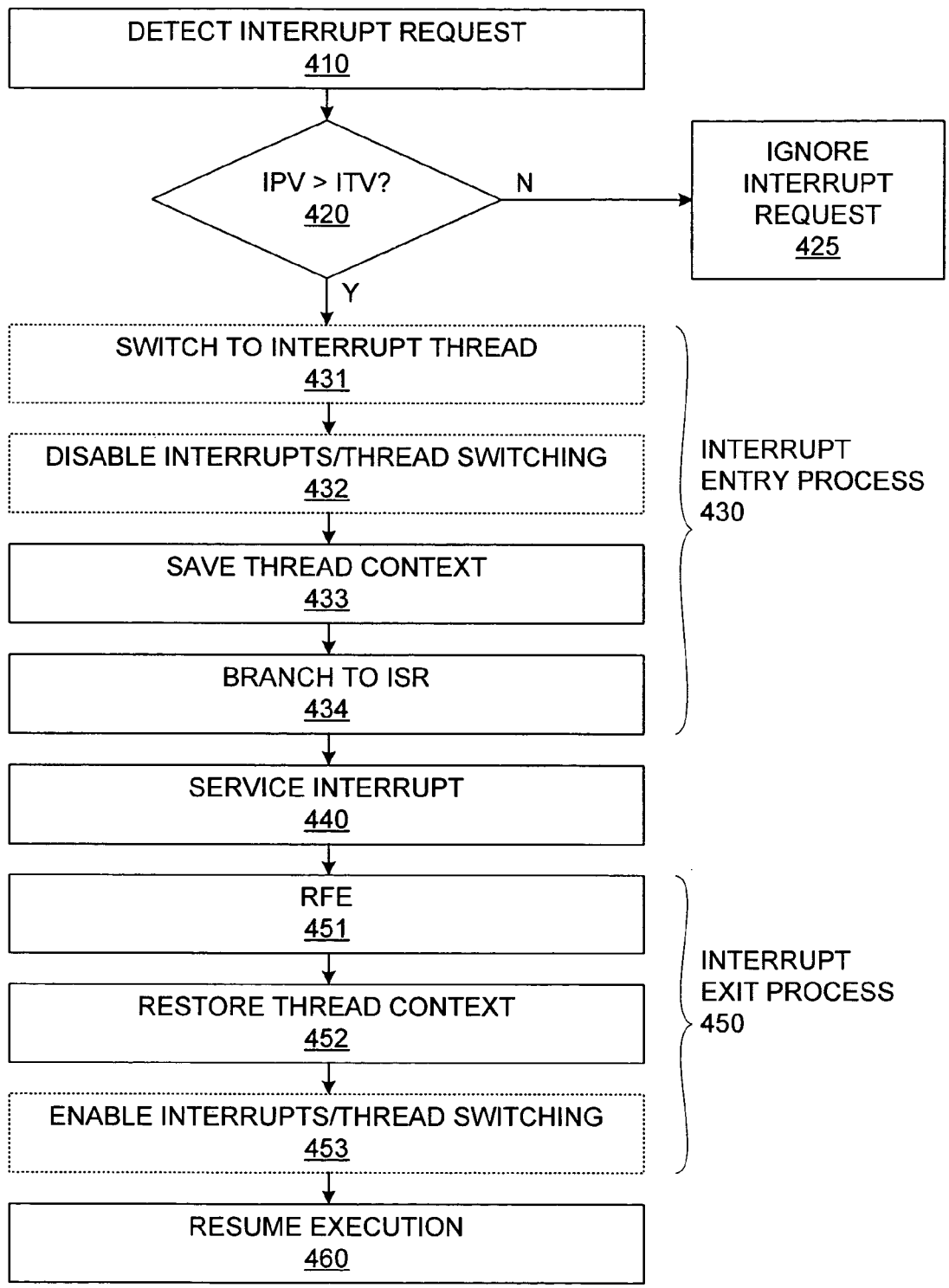
FIG. 4A is a flow diagram of an interrupt processing methodology in accordance with an embodiment of the invention.

FIG. 4A shows a flow diagram of an interrupt processing method in accordance with an embodiment of the invention. An interrupt request is detected in a "DETECT INTERRUPT REQUEST" step 410. The interrupt priority value (IPV, described above) associated with the requested interrupt is then compared to a specified interrupt threshold value (ITV, described above) in an "IPV>ITV?" step 420. If the interrupt priority value is not higher than the interrupt threshold value, then the interrupt is ignored in an "IGNORE INTERRUPT REQUEST" step 425. However, if the interrupt priority value is higher than the interrupt threshold value, an "INTERRUPT ENTRY PROCESS" step 430 is performed to prepare for the execution of an interrupt service routine.

According to an embodiment of the invention, INTERRUPT ENTRY PROCESS 430 can include an optional (as indicated by the dotted outline) "SWITCH TO INTERRUPT THREAD" step 431, in which execution is switched to a predetermined interrupt thread, as described above with respect to FIG. 3. According to another embodiment of the invention, INTERRUPT ENTRY PROCESS 430 can also include an optional "DISABLE INTERRUPTS/THREAD SWITCHING" step 432, in which interrupts and thread switching are disabled once the interrupt is accepted. Then, in a "SAVE THREAD CONTEXT" step 433 the executing thread context is saved, and in a "BRANCH TO ISR" step 434 execution branches to an interrupt handler address for the interrupt. Note also that according to an embodiment of the invention, step 433 can perform a full context save, in which all the registers of the executing thread are saved to appropriate context save locations, and according to another embodiment of the invention, step 433 can perform a partial context save, in which only a first set of the context registers are saved. The ISR then saves and restores the remaining context registers (the "second set") during interrupt servicing, which allows the saving and restoring of that second set of context registers to be avoided if those registers are not affected by the ISR, thereby improving overall interrupt processing speed.

The interrupt is then serviced in a "SERVICE INTERRUPT" step 440, after which an "INTERRUPT EXIT PROCESS" step 450 is performed to return control from the ISR. A return from exception (RFE) instruction is executed in a "RFE" step 451, and the thread context previously saved in step 433 is restored (popped) in a "RESTORE THREAD CONTEXT" step 452. Note that depending on whether a full or partial context save was performed in step 433, a corresponding full or partial, respectively, context restore will be performed in step 452. Then, interrupts and thread switching are enabled in an optional "ENABLE INTERRUPTS/ THREAD SWITCHING" step 453 if they were previously disabled (in optional step 432). Note that interrupts and thread switching may already have been enabled at this point, if the potential for resource conflicts has already passed (as described above with respect to FIG. 3).

Once INTERRUPT EXIT PROCESS 450 is complete, normal thread execution is resumed in a "RESUME EXECUTION" step 460. Note if execution was previously switched to an interrupt thread (in optional step 431), execution resumes in that interrupt thread, rather than in the thread that had originally been executing when the interrupt request was made. Execution can then switch to the (unblocked) active thread having highest execution priority.

Figure 4B:
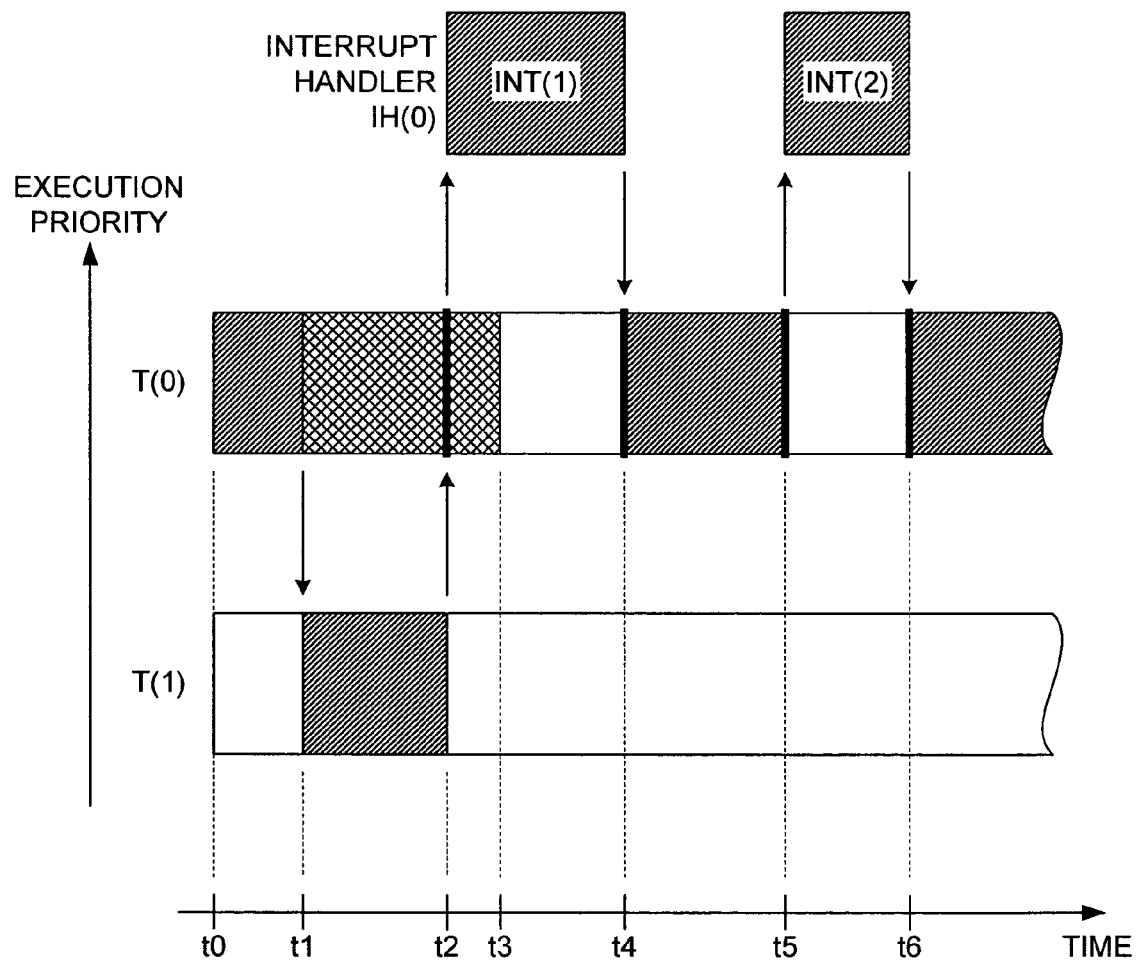
FIG. 4B is an operational diagram demonstrating interrupt processing following the flow diagram of FIG. 4A.

FIG. 4B shows an operational diagram for a multi-threaded system operating in accord with the flow diagram of FIG. 4A. Note that while FIG. 4B includes two active threads T(0), T(1) for explanatory purposes, the invention can be applied to any number of active threads. An "EXECUTION PRIORITY" axis indicates that thread T(0) is assigned a higher priority than thread T(1). At a time to, thread T(0) is executing (indicated by the diagonal hatching), and thread T(1) is held pending (indicated by the solid white fill). At a time t1, a blocking event (such as a cache miss) occurs, and the execution of thread T(0) is halted (indicated by the cross-hatching). Because thread T(0) is blocked, lower-priority thread T(1) then begins executing at time t1.

For purposes of explanation, let thread T(0) be designated as the interrupt thread (as described above with respect to step 431 of FIG. 4A). Then, when an interrupt INT(1) is requested at a time t2 (interrupt INT(1) having an interrupt priority higher than a specified interrupt threshold value), execution switches from thread T(1) to thread T(0) as part of INTERRUPT ENTRY PROCESS 430 described with respect to FIG. 4A (and indicated by the dark line in thread T(0) at time t2). The optional interrupt and thread switch disabling (step 432) can be performed, the context of thread T(0) is saved (step 433) and an interrupt handler IH(0) is called (step 434). Interrupt handler IH(0) then services interrupt INT(1), and when this servicing is competed at a time t4, the INTERRUPT EXIT PROCESS 450 is performed (indicated by the dark line in thread T(0) at time t4). A RFE instruction is executed (step 451), the thread T(0) context is restored (step 452), and interrupts and thread switching are re-enabled (step 453), if necessary.

Since thread T(0) is no longer blocked at time t4 (blocking event ended at time t3), execution after INTERRUPT EXIT PROCESS 450 remains in thread T(0), since it has a higher execution priority than thread T1. Note, however, that the interrupt thread is not required to be the thread having the highest execution priority. For example, if thread T(1) is assigned a higher priority than thread T(0), then upon completion of INTERRUPT EXIT PROCESS 450, execution would immediately switch from thread T(0) (the interrupt thread) to thread T(1) (highest priority unblocked thread).

At a time t5, while thread T(0) is executing, another interrupt INT(2) is requested (once again, having an interrupt priority higher than the interrupt threshold value. This time, since interrupt thread T(0) is already executing, the interrupt entry process (indicated by the dark line in thread T(0) at time t5) no thread switch is necessary. The optional interrupt and thread switch disabling is performed (step 432), the context of thread T(0) is saved (step 433), and interrupt handler IH(0) is called (step 434) to service interrupt INT(2) (step 440). Upon completion of the service routine, the INTERRUPT EXIT PROCESS 450 is performed, and execution resumes in thread T(0) (step 460) at a time t6.

Figure 5:
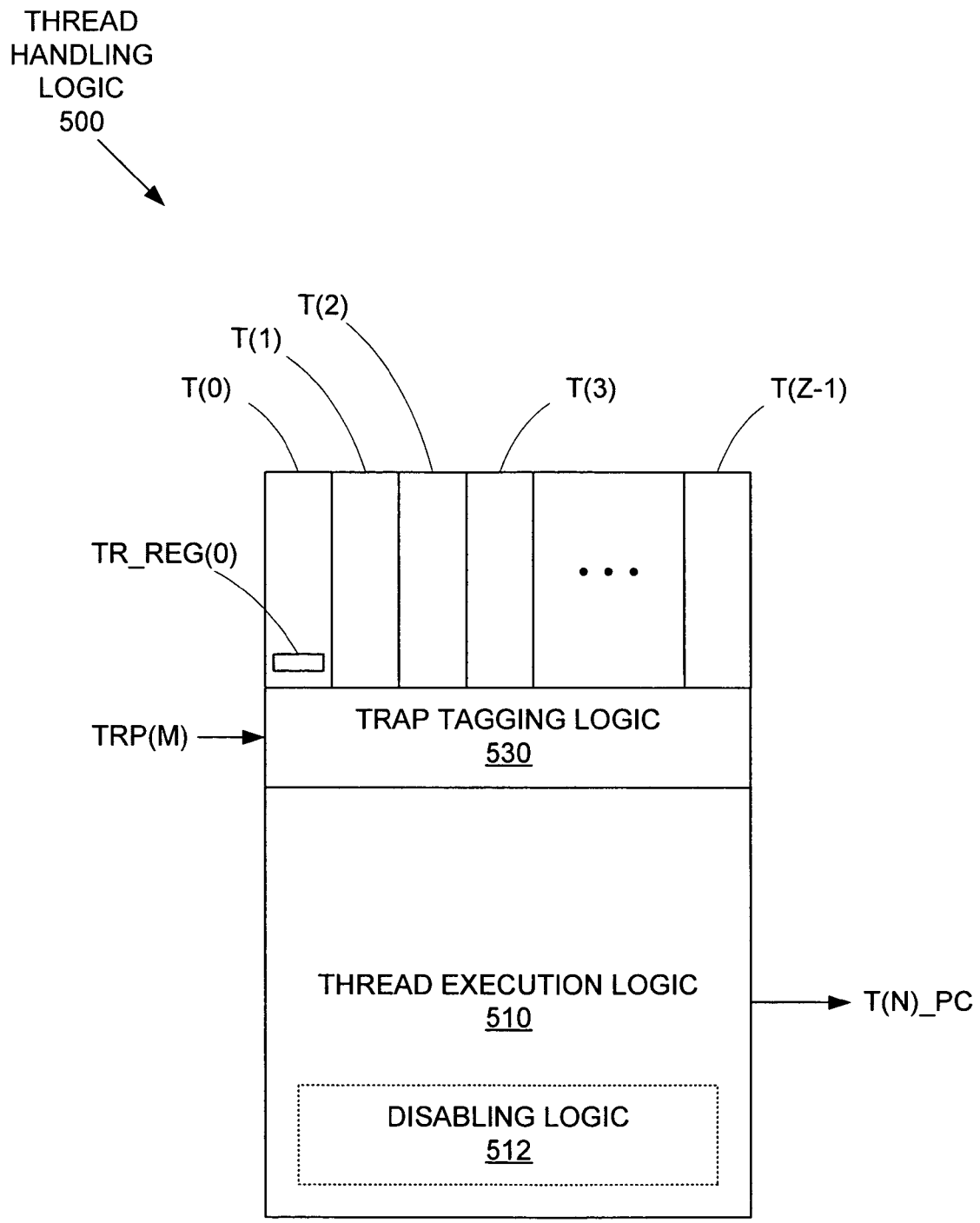
FIG. 5 is a simplified block diagram of a thread handling logic unit including trap tagging logic in accordance with an embodiment of the invention.

FIG. 5 shows a simplified block diagram of thread handling logic 500 for a multi-threaded real-time embedded system (not shown), according to another embodiment of the invention. Thread handling logic 500 is based on multi-threaded code and includes thread execution logic 510 for managing the execution of a quantity Z of active threads (T(0) through T(Z−1)) and trap tagging logic 530 for ensuring proper trap handling in the multi-threaded environment. Normal operation of thread handling logic 500 proceeds in substantially the same manner as the normal operation of thread handling logic 300 shown in FIG. 3, with thread execution logic 510 assigning each active thread an execution priority value and executing the highest priority unblocked active thread (thread T(N) for discussion purposes) by providing its thread program counter T(N)_PC to an instruction fetch unit (not shown). After each instruction fetch, thread execution logic 510 increments thread program counter T(N)_PC to select the next instruction in the executing thread. When a blocking event occurs, thread execution logic 510 switches to the next highest priority unblocked thread so that processor cycles are not wasted.

To ensure proper handling of traps, thread execution logic 510 is configured to service traps only in the thread in which the trap occurred. Therefore, to ensure trap traceability, trap tagging logic 530 can record the "trap background data" for a trap—i.e., the information required for proper trap servicing (cause of the trap, the thread and instruction with which the trap is associated, etc.). While this information storage may not be necessary for synchronous traps, which allow for interruption of the instruction stream at the instruction that caused the trap, storing background trap data for asynchronous traps ensures that such traps are properly handled, regardless of the number of instructions or thread switches that take place before the trap is actually serviced. According to an embodiment of the invention, each thread includes a trap register(s), such as trap register TR_REG(0) in threat T(0), in which the trap background data can be stored.

Thus, according to an embodiment of the invention, when trap tagging logic 530 detects a trap TRP(M) related to a thread T(M), it determines whether or not trap TRP(M) is synchronous or asynchronous. If trap TRP(M) is synchronous, trap tagging logic 530 simply passes trap TRP(M) to thread execution logic 510, which services the trap. Note that for a synchronous trap TRP(M), the executing thread would be its originating thread T(M) and the causal instruction would be known, so thread execution logic 510 would not need to provide any additional information to allow trap TRP(M) to be properly serviced. If trap TRP(M) is asynchronous, trap tagging logic 530 records the trap background data for trap TRP(M) and generates a "trap pending" indicator for thread T(M). (Note that according to other embodiments of the invention, trap tagging logic 530 can automatically record the trap background data for all traps, regardless of whether they are synchronous or asynchronous.) Once thread T(M) resumes execution, the trap pending indicator causes thread execution logic 510 to service trap TRP(M) using the stored trap background data. In this manner, trap tagging logic 530 ensures that even asynchronous traps are correctly serviced.

According to another embodiment of the invention, thread execution logic 510 includes disabling logic 512 for disabling interrupts and thread switching once a trap has been taken, and re-enabling interrupts and thread switching once the trap has been sufficiently serviced. In doing so, disabling logic 512 can prevent problems such as unintended trap re-entrancy by ensuring that trap servicing is not disrupted prematurely. Note that according to an embodiment of the invention, disabling logic 512 can disable interrupts and thread switching for less than the full duration of the trap servicing process, so long as the period of disablement is long enough to prevent any resource usage conflicts. Note further that according to various embodiments of the invention, disabling logic 512 can also be used to perform the functions of disabling logic 312 shown in FIG. 3 for interrupt processing.

Figure 6A:
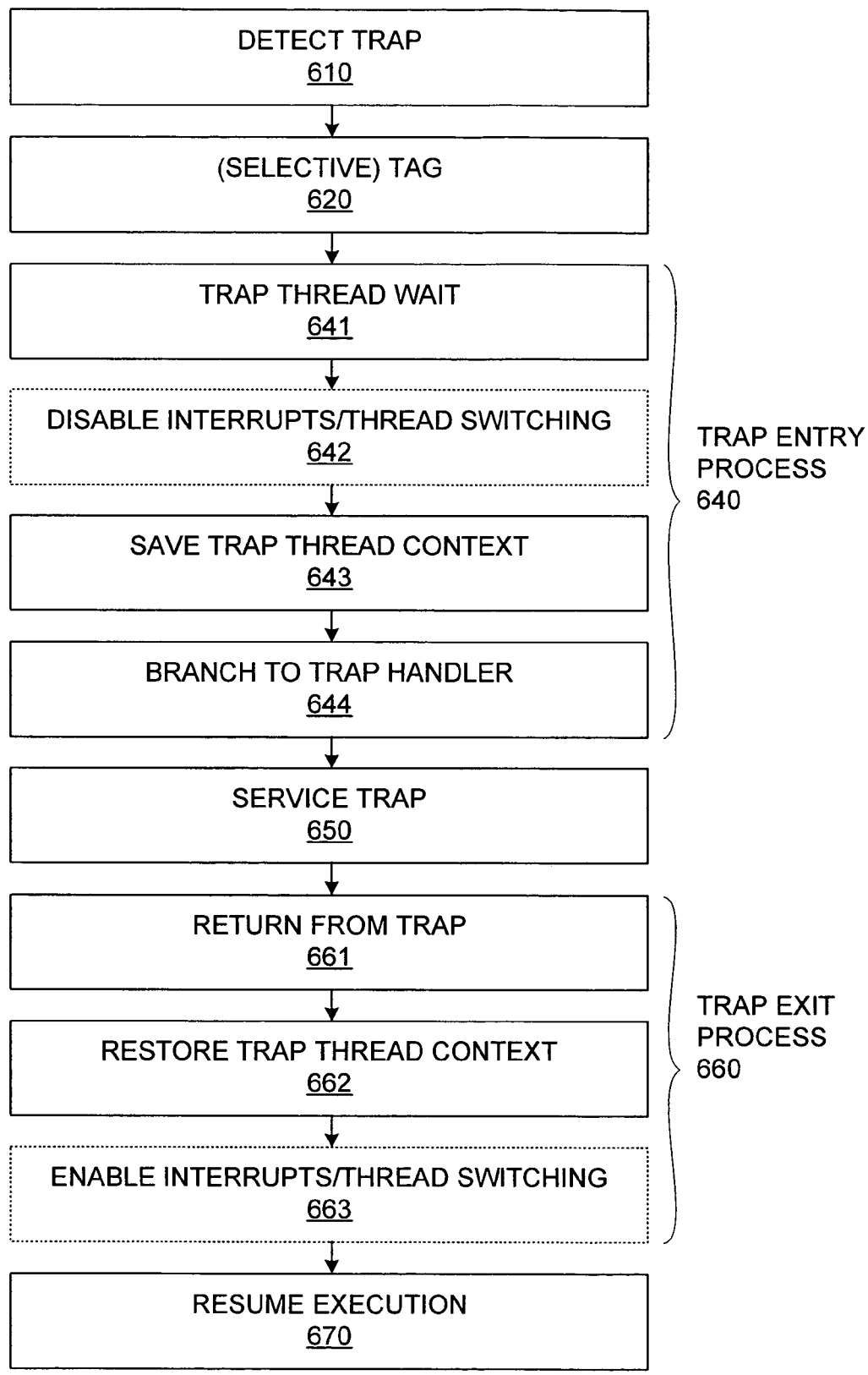
FIG. 6A is a flow diagram of a trap processing methodology in accordance with an embodiment of the invention.

FIG. 6A shows a flow diagram of an interrupt processing method in accordance with an embodiment of the invention. A trap is detected in a "DETECT TRAP" step 610. In a "(SELECTIVE) TAG" step 620, the trap background data associated with the trap is stored and a trap pending indicator for the trap is generated, if necessary. Note that as described above, the trap background data can be recorded for only asynchronous traps or for all traps, according to various embodiments of the invention. A "TRAP ENTRY PROCESS" step 640 is then initiated to prepare for execution of the trap service routine. For asynchronous traps, a "TRAP THREAD WAIT" step 641 monitors thread execution until a thread associated with a trap pending indicator begins execution. According to an embodiment of the invention, TRAP ENTRY PROCESS 640 can include an optional (as indicated by the dotted outline) "DISABLE INTERRUPTS/THREAD SWITCHING" step 642, in which interrupts and thread switching are disabled once the trap pending indicator is detected or any synchronous trap handling begins. Then, in a "SAVE TRAP THREAD CONTEXT" step 643, the executing thread context (which is now the same as the trap thread context) is saved, and in a "BRANCH TO TRAP HANDLER" step 644, execution branches to a trap handler address for the interrupt.

Note that according to an embodiment of the invention, step 643 can perform a full context save, in which all the registers of the executing thread are saved to appropriate context save locations, and according to another embodiment of the invention, step 643 can perform a partial context save, in which only a first set of the context registers are saved. The trap handler then saves and restores the remaining context registers (the "second set") during trap servicing, which allows the saving and restoring of that second set of context registers to be avoided if those registers are not affected by the trap handler, thereby improving overall trap processing speed.

The trap is then serviced in a "SERVICE TRAP" step 650, after which a "TRAP EXIT PROCESS" step 660 is performed. A return from trap instruction is executed in a "RETURN FROM TRAP" step 661, and the thread context previously saved in step 643 is restored in a "RESTORE TRAP THREAD CONTEXT" step 662. Note that depending on whether a full or partial context save was performed in step 643, a corresponding full or partial, respectively, context restore will be performed in step 662. Then, interrupts and thread switching are enabled in an optional "ENABLE INTERRUPTS/THREAD SWITCHING" step 663 if they were previously disabled (in optional step 642). Note that interrupts and thread switching may already have been enabled at this point, if the potential for resource conflicts has already passed (as described above with respect to FIG. 5). Once TRAP EXIT PROCESS 660 is complete, normal thread execution is resumed in a "RESUME EXECUTION" step 670.

Figure 6B:
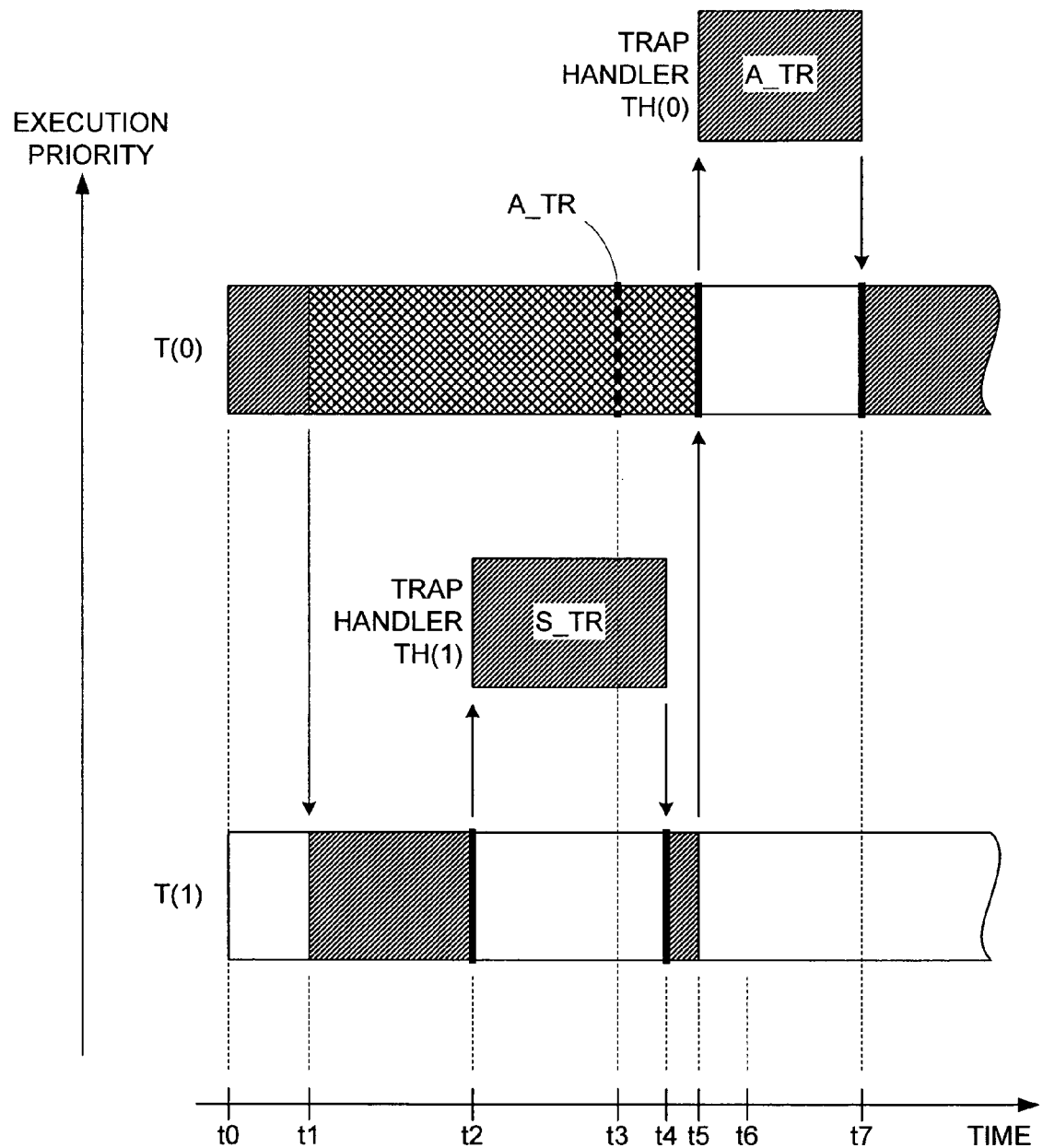
FIG. 6B is an operational diagram demonstrating trap processing following the flow diagram of FIG. 6A.

FIG. 6B shows an operational diagram for a multi-threaded system operating in accord with the flow diagram of FIG. 6A. FIG. 6B depicts active threads T(0) and T(1) for explanatory purposes (however, note that the invention can be applied to any number of active threads). An "EXECUTION PRIORITY" axis indicates that thread T(0) is assigned a higher priority than thread T(1). At a time t0, thread T(0) is executing (indicated by the diagonal hatching), and thread T(1) is held pending (indicated by the solid white fill). At a time t1, a blocking event (such as a cache miss) occurs, and the execution of thread T0 is halted (indicated by the cross-hatching). Because thread To is blocked, lower-priority thread T1 then begins executing at time t1.

At time t2, thread T(1) generates a synchronous trap S_TR, so the TRAP ENTRY PROCESS 640 described with respect to FIG. 6A (and indicated by the dark line in thread T(1) at time t2) is initiated. The optional interrupt and thread switch disabling (step 642) can be performed, the context of thread T(1) is saved (step 643) and a trap handler TH(1) is called (step 644). Trap handler TH(1) then services interrupt trap S_TR, and when this servicing is competed at time t4, the TRAP EXIT PROCESS 660 is performed (indicated by the dark line in thread T(1) at time t4). A return from trap instruction is executed (step 661), the thread T(1) context is restored (step 662), and interrupts and thread switching are re-enabled (step 663), if necessary.

As indicated by the dotted line in thread T(0) at a time t3 (prior to time t4), an asynchronous trap A_TR is generated from thread T(0) at time t3. However, since trap handler TH(1) is still servicing trap S_TR at time t3, the trap background data for asynchronous trap A_TR is recorded (step 620) and a trap pending indicator for thread T(0) is generated and the TRAP ENTRY PROCESS 640 for trap A_TR begins. Initially, the process remains in a wait state (step 641) since even after the servicing of trap S_TR is completed at time t4, servicing of trap A_TR cannot begin, since thread T(0) is still blocked. Once thread T(0) becomes unblocked at a time t5, execution switches from the lower-priority thread T(1) to higher-priority thread T(0). Then, due to the presence of the trap pending indicator generated at time t3, servicing of trap A_TR is then performed in a manner substantially similar to that described with respect to trap S_TR.

Figure 7:
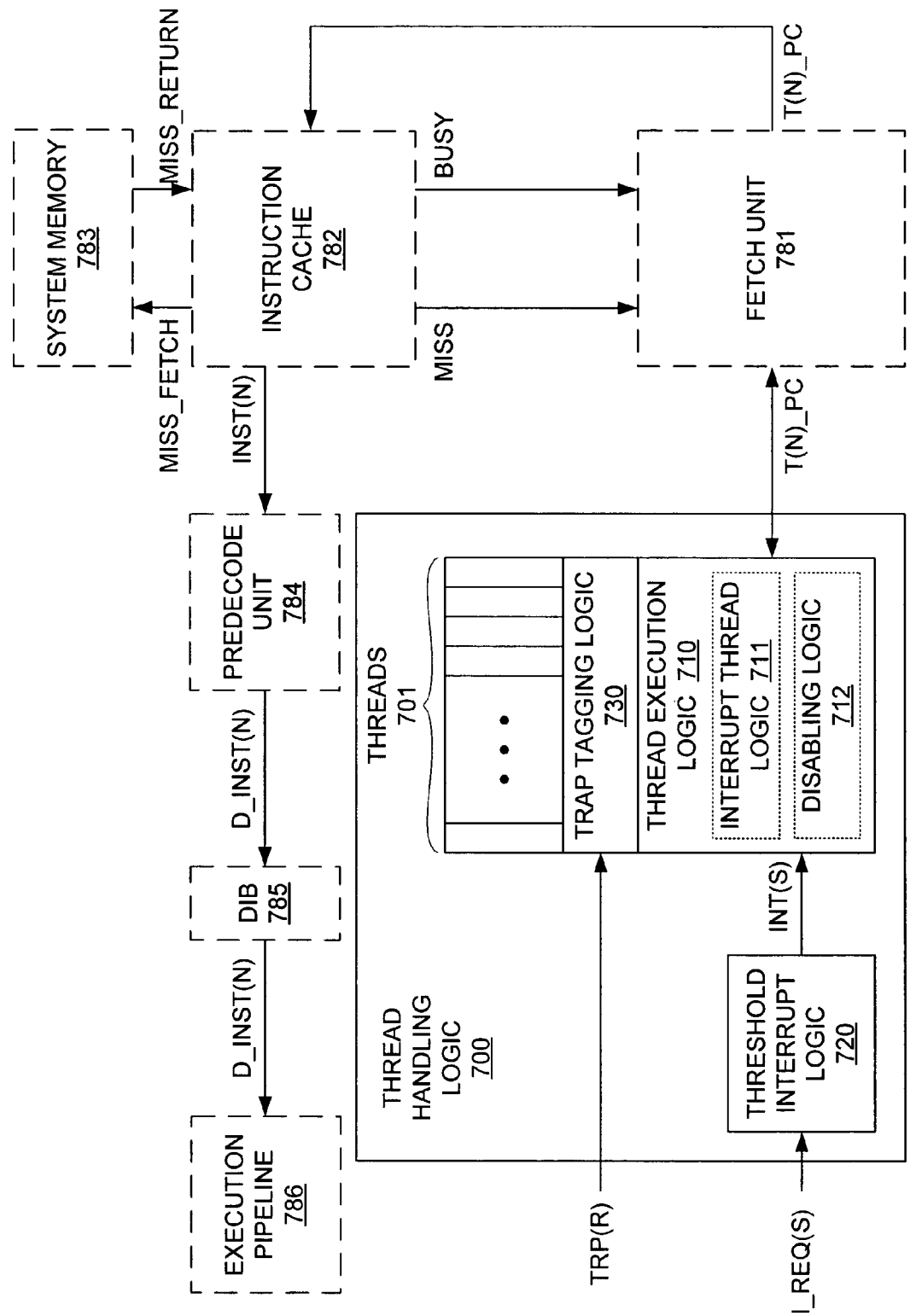
FIG. 7 is a simplified block diagram of a multi-threaded real-time embedded system in accordance with an embodiment of the invention.

FIG. 7 shows a simplified block diagram of thread handling logic 700 that includes both interrupt and trap processing capabilities for a multi-threaded real-time embedded system (not shown), according to another embodiment of the invention. Thread handling logic 700 is based on multi-threaded code and includes thread execution logic 710 for managing the execution of a plurality of active threads 701, threshold interrupt logic 720 for directing the processing of interrupts, and trap tagging logic 730 for ensuring proper trap handling in the multi-threaded environment. Thread execution logic 710 assigns each active thread an execution priority value (similar to the thread priority values described with respect to FIGS. 1 and 2). During normal operation (i.e., non-interrupt/trap operation) of thread handling logic 700, thread execution logic 710 executes the highest priority unblocked active thread (thread T(N) for discussion purposes) and generates instruction requests using the thread program counter T(N)_PC of that thread.

For example, thread program counter T(N)_PC can be provided to a fetch unit 781, which requests an instruction INST(N) from the program counter T(N)_PC address in an instruction cache 782. Instruction INST(N) is decoded by a predecode unit 784 into a decoded instruction D_INST(N), and is then stored in a decoded instruction buffer (DIB) 785, where it can be read into an execution pipeline 786 for execution. If a cache miss occurs, instruction cache 782 sends a MISS signal to fetch unit 781, which can then instruct thread execution logic 710 to switch to the next highest priority thread 701. Meanwhile, instruction cache 782 sends a MISS_FETCH signal to system memory to read the desired instruction as a signal MISS_RETURN. A busy signal BUSY can be provided while instruction cache 782 cannot service any additional misses. Note that various other architectures can be used with thread handling logic 700, as indicated by the dashed lines used for fetch unit 781, instruction cache 782, system memory 783, predecode unit 784, DIB 785, and execution pipeline 786.

To process interrupts, threshold interrupt logic 720 and thread execution logic 710 operate in a manner substantially similar to threshold interrupt logic 320 and thread execution logic 310, respectively, shown in FIG. 3. An interrupt request I_REQ(S) is only accepted by thread execution logic 710 if a unique interrupt priority value (IPV) assigned to the requested interrupt INT(S) is higher than interrupt threshold value ITV defined by threshold interrupt logic 720. Optional interrupt thread logic 711 in thread execution logic 710 switches execution to a predetermined interrupt thread prior to the handling of any interrupt, in a manner substantially similar to that described with respect to interrupt thread logic 311 shown in FIG. 3. Optional disabling logic 712 can be used to disable interrupts and thread switching for a predetermined portion of the interrupt handling process, in a manner substantially similar to that described with respect to disabling logic 312 shown in FIG. 3.

To process traps, trap tagging logic 730 and thread execution logic 710 operate in a manner substantially similar to trap tagging logic 530 and thread execution logic 510, respectively, shown in FIG. 5. When trap tagging logic 730 detects a trap TRP(R), it saves the trap background data and generates a trap pending indicator as necessary, so that the trap can be serviced when its originating thread executes. Optional disabling logic 712 can be used to disable interrupts and thread switching for a predetermined portion of the trap handling process, in a manner substantially similar to that described with respect to disabling logic 512 shown in FIG. 5.

Because a certain number of clock cycles are required before interrupt or trap handling instructions can propagate to DIB 785, there will typically be a delay between the detection (and completion) of an instruction request or trap condition, and the actual start (or completion) of the execution of the instruction or trap handling instructions. According to an embodiment of the invention, DIB 785 is a type of first-in-first-out (FIFO) memory that allows any existing instructions in DIB 785 to be executed when an interrupt or trap is taken by thread execution logic 710 before the ISR or trap handling instructions are fed into execution pipeline 786. Similarly, when an instruction or trap handling routine is completed, those instructions prefetched during the RFE or return from trap instruction could simply be discarded since the executing context would still be the ISR or trap handling context. According to another embodiment of the invention, predecode unit 784 could include a branch lookahead facility to identify an upcoming RFE or return from trap so that the appropriate thread can begin prefetching instructions without delay.

Various embodiments of the invention have been described to ensure proper handling of interrupts and traps in a real-time, multi-threaded embedded system. The various embodiments of the invention that are described above are illustrative only of the principles of this invention and are not intended to limit the scope of the invention to the particular embodiments described. Thus, the invention is limited only by the following claims and their equivalents.

The invention claimed is:

1. A method for operating a multi-threaded system having a plurality of active threads, the method comprising:
   assigning a interrupt execution priority value to each of a plurality of interrupts;
   specifying a global interrupt threshold value that is higher than the execution priority of each of the plurality of active threads; and processing a requested interrupt only when the interrupt execution priority value assigned to the requested interrupt is higher than the global interrupt threshold value.

2. The method of claim 1, wherein processing the requested interrupt comprises:
   performing an interrupt entry process to prepare for an interrupt service routine (ISR);
   executing the ISR; and
   performing an interrupt exit process to return control from the ISR.

3. The method of claim 2, wherein performing the interrupt entry process comprises:
   identifying one of the plurality of active threads as an interrupt thread;
   switching to the interrupt thread if the interrupt thread is not executing; and
   branching to the ISR.

4. The method of claim 3, wherein each of the plurality of active threads comprises a thread context, and wherein performing the interrupt entry process further comprises saving the thread context of the interrupt thread.

5. The method of claim 4, wherein performing the interrupt exit process comprises:
   executing a return from exception (RFE) instruction; and
   restoring the thread context of the interrupt thread.

6. The method of claim 5, wherein performing the interrupt entry process further comprises disabling interrupts and thread switching.

7. The method of claim 6, wherein performing the interrupt exit process further comprises enabling interrupts and thread switching.

8. The method of claim 6, wherein executing the ISR comprises enabling interrupts and thread switching after a predetermined interval.

9. The method of claim 3, wherein each of the plurality of active threads consists of a first set of context registers and a second set of context registers, wherein performing the interrupt entry process further comprises saving the first set of context registers of the interrupt thread, and wherein executing the ISR comprises:
   saving the second set of context registers of the interrupt thread if the second set of context registers of the interrupt thread are required for servicing the requested interrupt;
   servicing the requested interrupt; and
   restoring the second set of context registers of the interrupt thread after servicing the requested interrupt if the second set of context registers of the interrupt thread were required for servicing the requested interrupt.

10. The method of claim 9, wherein performing the interrupt exit process comprises:
    executing a return from exception (RFE) instruction; and
    restoring the upper context registers of the interrupt thread.

11. The method of claim 1, further comprising processing traps only in the active threads originating the traps.

12. The method of claim 11, wherein processing traps comprises:
    detecting a trap from an originating thread, the originating thread being one of the plurality of active threads;
    storing trap background data for the trap if the trap is asynchronous; and
    associating a trap pending indicator with the originating thread if the originating thread is not executing.

13. The method of claim 12, wherein processing traps further comprises:
    performing a trap entry process to prepare for a trap handling routine;
    executing the trap handling routine; and
    performing a trap exit process to return control from the trap handling routine.

14. The method of claim 13, wherein each of the plurality of active threads comprises a thread context, and wherein performing the trap entry process comprises:
    waiting for originating thread to start executing if the originating thread is not executing;
    saving the thread context of the originating thread; and
    branching to a trap handler.

15. The method of claim 14, wherein waiting for the originating thread to start executing comprises monitoring the plurality of active threads until execution switches to one of the plurality of active threads associated with the trap pending indicator.

16. The method of claim 14, wherein performing the trap exit process comprises:
    executing a return from trap instruction; and
    restoring the context of the originating thread.

17. The method of claim 16, wherein performing the trap entry process further comprises disabling interrupts and thread switching.

18. The method of claim 17, wherein performing the trap exit process further comprises enabling interrupts and thread switching.

19. The method of claim 17, wherein executing the trap handling routine comprises enabling interrupts and thread switching after a predetermined interval.

20. The method of claim 13, wherein each of the plurality of active threads consists of a first set of context registers and a second set of context registers, wherein performing the trap entry process further comprises saving the first set of context registers of the originating thread, and wherein executing the trap handling routine comprises:
    saving the second set of context registers of the originating thread if the second set of context registers of the originating thread are required for servicing the trap;
    servicing the trap; and
    restoring the second set of context registers of the originating thread after servicing the trap if the second set of context registers of the interrupt thread were required for servicing the trap.

21. The method of claim 20, wherein performing the interrupt exit process comprises:
    executing a return from trap instruction; and
    restoring the upper context registers of the originating thread.

22. The method of claim 1, wherein the global interrupt threshold value is a single global interrupt threshold value.

23. A method for operating a multi-threaded system having a plurality of active threads, the method comprising:
    accepting a request for an interrupt;
    switching execution to a predetermined one of the plurality of active threads; and
    executing an interrupt service request from the predetermined one of the plurality of active threads to service the interrupt,
    wherein accepting a request for an interrupt comprises:
       assigning a interrupt execution priority value to each interrupt for the multi-threaded embedded system;
       specifying a global interrupt threshold value that is higher than the execution priority of each of the plurality of active threads; and
       taking the interrupt only when the interrupt execution priority value assigned to the interrupt is higher than the global interrupt threshold value.

24. The method of claim 23, wherein the global interrupt threshold value is a single global interrupt threshold value.

25. A multi-threaded system comprising:
thread execution logic configured to generate instruction requests from an executing thread; and
threshold interrupt logic configured to generate a global interrupt threshold value that is higher than the execution priority of each of the threads of the multi-threaded system, wherein the thread execution logic only accepts interrupts assigned a interrupt execution priority value higher than the global interrupt threshold value.

26. The multi-threaded system of claim 25, further comprising interrupt thread logic configured to switch execution to a selected interrupt thread before servicing any interrupt.

27. The multi-threaded system of claim 26, further comprising disabling logic configured to disable interrupts and thread switching while an interrupt is being serviced.

28. The multi-threaded system of claim 27, further comprising thread tagging logic configured to store trap background data for asynchronous traps, wherein every trap is handled in its originating thread.

29. The multi-threaded system of claim 25, wherein the global interrupt threshold value is a single global interrupt threshold value.

30. A multi-threaded system comprising:
means for specifying a global interrupt threshold value that is higher than the execution priority of each of the threads of the multi-threaded system; and
thread execution logic means for processing a requested interrupt only when a interrupt execution priority value assigned to the requested interrupt is higher than the global interrupt threshold value.

31. The multi-threaded system of claim 30, wherein the means for processing the requested interrupt comprises:
means for identifying one of the plurality of active threads as an interrupt thread;
means for switching to the interrupt thread if the interrupt thread is not executing; and
means for branching to the ISR.

32. The multi-threaded system of claim 31, wherein the means for processing the requested interrupt further comprises means for saving a thread context of the interrupt thread.

33. The multi-threaded system of claim 32, wherein the means for processing the requested interrupt further comprises means for restoring the thread context of the interrupt thread after executing a return from exception (RFE) instruction.

34. The multi-threaded system of claim 33, wherein the means for processing the requested interrupt further comprises means for disabling interrupts and thread switching during execution of the ISR.

35. The multi-threaded system of claim 30, further comprising means for processing traps, the means for processing traps comprising:
means for detecting a trap from an originating thread;
means for storing trap background data for the trap if the trap is asynchronous;
means for processing the trap if the originating thread is executing; and
means for associating a trap pending indicator with the originating thread if the originating thread is not executing.

36. The multi-threaded system of claim 35, wherein the means for processing traps further comprises means for detecting execution of an active thread associated with the trap pending indicator.

37. The multi-threaded system of claim 36, wherein the means for processing the trap comprises means for disabling interrupts and thread switching.

38. The multi-threaded system of claim 30, wherein the global interrupt threshold value is a single global interrupt threshold value.

39. A method for operating a multi-threaded system, the method comprising:
storing trap background data for an asynchronous trap generated from a thread;
generating a trap pending indicator for the thread; and
servicing the asynchronous trap using the stored background data, due to the trap pending indicator, when the thread resumes execution.

40. A multi-threaded system comprising:
trap tagging logic configured to record trap background data for an asynchronous trap, and to generate a trap pending indicator for a thread in which the asynchronous trap occurred; and
thread execution logic configured to service the asynchronous trap using the recorded trap background data, due to the trap pending indicator, when the thread resumes execution.

* * * * *